United States Patent
Kolev

[11] Patent Number: 5,889,831
[45] Date of Patent: Mar. 30, 1999

[54] CONTAINMENT OF A NUCLEAR POWER STATION

[75] Inventor: Nikolay Kolev, Herzogenaurach, Germany

[73] Assignee: Siemens Aktiengellschaft, Munich, Germany

[21] Appl. No.: 86,322

[22] Filed: May 28, 1998

Related U.S. Application Data

[63] Continuation of PCT/EP96/05230 Nov. 26, 1996.

[30] Foreign Application Priority Data

Nov. 28, 1995 [DE] Germany .................. 195 44 346.2

[51] Int. Cl.$^6$ .................................................. G21C 9/06

[52] U.S. Cl. .................................................. 376/300

[58] Field of Search ................... 376/300, 301; 423/580.1

[56] References Cited

U.S. PATENT DOCUMENTS

| | | | |
|---|---|---|---|
| 4,891,181 | 1/1990 | Heck | 376/300 |
| 5,108,696 | 4/1992 | Heck | 376/300 |
| 5,492,686 | 2/1996 | Hill | 376/301 |
| 5,592,521 | 1/1997 | Hill | 376/301 |

FOREIGN PATENT DOCUMENTS 3004677  8/1981  Germany .................. 376/300

*Primary Examiner*—Daniel D. Wasil
*Attorney, Agent, or Firm*—Herbert L. Lerner; Laurence A. Greenburg

[57] ABSTRACT

A containment of a nuclear power station includes a device for igniting hydrogen contained in a hydrogen/air mixture. A central electrode for lightning flash generation is provided to ensure the maintenance of a particularly low hydrogen concentration in the entire interior of the containment. The central electrode is connected to a high-voltage source for generating a high voltage greater than the disruptive discharge voltage of air.

3 Claims, 1 Drawing Sheet

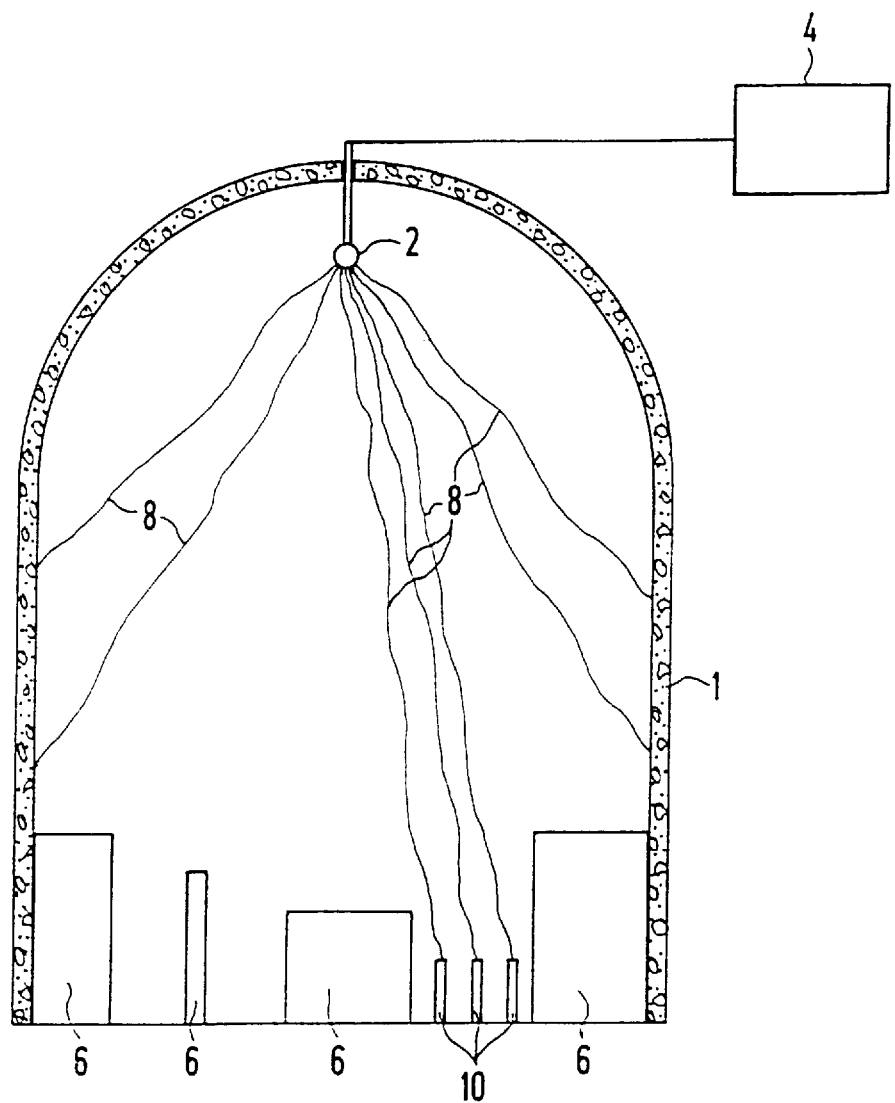

CONTAINMENT OF A NUCLEAR POWER STATION

CROSS-REFERENCE TO RELATED APPLICATION

This application is a continuation of International Application PCT/EP96/05230, filed on Nov. 26, 1996, which designated the United States.

BACKGROUND OF THE INVENTION

1. Field of the Invention

The invention relates to a containment of a nuclear power station having a device for igniting hydrogen contained in a hydrogen/air mixture.

In the ever so unlikely event of accident situations in which an oxidation of zirconium can occur, for example due to a core heat-up, for precautionary reasons it is expected that hydrogen gas can be formed in a nuclear power station and released inside the containment surrounding the reactor core. An explosive gas mixture, in particular a hydrogen/air mixture, can thereby be produced inside the containment.

Various devices or methods are discussed for the purpose of preventing a formation of such an explosive gas mixture in the containment of a nuclear power station. Those include, for example, devices such as catalytic recombiners or catalytically and/or electrically operated ignition devices for igniting hydrogen. When hydrogen ignites, it reacts with oxygen present in the air in the containment to form water, and is thereby recombined. Such an ignition device is disclosed, for example, in German Published, Non-Prosecuted Patent Application DE 41 25 085 A1, corresponding to U.S. Pat. Nos. 5,492,686 and 5,592,521. Alternatively, consideration is also given to methods for permanently or subsequently inerting the containment.

In a conventionally used electrically driven ignition device such as is described, for example, in German Patent DE 30 04 677 C, a multiplicity of igniters or spark plugs is disposed inside the containment of the nuclear power station. Each of those igniters is suitable for igniting the hydrogen of the hydrogen/air mixture in its immediate environment, and thus for recombining it. The action of such an igniter is therefore narrowly limited locally. It is therefore impossible to keep the hydrogen concentration inside the entire containment at a uniformly low level below the prescribed limiting value, by using such igniters.

SUMMARY OF THE INVENTION

It is accordingly an object of the invention to provide a containment of a nuclear power station equipped for the ignition of hydrogen contained in a hydrogen/air mixture, which overcomes the hereinafore-mentioned disadvantages of the heretofore-known devices of this general type in such a way that in the event of an accident it is possible to ensure the maintenance of a particularly low hydrogen concentration in its entire interior.

With the foregoing and other objects in view there is provided, in accordance with the invention, a containment of a nuclear power station, comprising a device for igniting hydrogen contained in a hydrogen/air mixture, the device including a central electrode for lightning flash generation and a high-voltage source connected to the central electrode for generating a high voltage greater than a disruptive discharge voltage of air.

In a containment that is constructed in such a way, each grounded internal part can act as a counter-electrode for lightning flash generation by spark discharge, because of the electrical potential difference between the central electrode and grounded internal parts. The central electrode, which is placed under a high voltage in the event of an accident, is then discharged through a lightning flash discharge to the counter-electrode. In this case the lightning flashes are chaotic per se, with the result that every possible counter-electrode becomes the target of a lightning flash discharge in accordance with statistical criteria. The lightning flash discharges thus penetrate the entire interior of the containment, so that it is possible for subspaces inside the containment to be penetrated particularly frequently, depending on the configuration of the internal parts. It is thereby ensured that no subspaces are formed from which the chaotic lightning flash discharges are excluded and in which the hydrogen concentration could exceed a critical value.

The high-voltage source can be constructed as a DC voltage source, for example in the manner of a Van-De-Graaff generator.

In accordance with another feature of the invention, in order to preclude endangering the internal parts of the containment, as well as putting operational staff at risk from the lightning flash discharges, the high-voltage source is constructed to generate a high voltage with a frequency of more than 1 kH. On one hand, specifically, the frequency-dependent disruptive discharge voltage of air is lower for high frequencies than for low frequencies. A lightning flash discharge at a high frequency can then already be triggered at a peak voltage which is low in comparison with a low frequency. On the other hand, because of the skin effect, the lightning flash discharges emanating from the central electrode connected to such a high-frequency high-voltage source are already screened at a very shallow depth of penetration into the counter-electrode or an internal part, and are therefore incapable of penetrating into the interior of the respective internal part.

In accordance with a concomitant feature of the invention, there is provided a number of counter-electrodes disposed in the interior of the containment for conducting lightning flashes. The counter-electrodes can define a preferred direction for a lightning flash discharge. As a result, the containment subspace surrounding the counter-electrodes is preferably penetrated by the lightning flash discharges. Consequently, hydrogen which is, for example, preferably produced in a subspace of the containment known as a hydrogen source, can be ignited in a particularly effective manner by a number of counter-electrodes in this subspace. However, even in the case of a containment having a number of such counter-electrodes, the penetration of the subspace of the containment which is not provided with counter-electrodes, by lightning flash discharges is ensured, although with reduced probability. The result is that even for such a containment the ignition of hydrogen is ensured in its entire interior or volume.

The advantages achieved with the invention are, in particular, that due to the central electrode for lightning flash generation which is connected to the high-voltage source, chaotic lightning flash discharges can be generated between the central electrode and the internal parts of the containment which act as counter-electrode. Such chaotic lightning flash discharges penetrate the entire volume of the containment, including those subregions or subspaces of the containment which cannot be adequately reached by conventional ignition devices. The result is to ensure volumetric bonding of the hydrogen, that is to say bonding of the hydrogen in the entire volume of the containment.

Other features which are considered as characteristic for the invention are set forth in the appended claims.

Although the invention is illustrated and described herein as embodied in a containment of a nuclear power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a diagrammatic, sectional view of a containment of a nuclear power station having a single electrode for lightning flash generation.

DESCRIPTION OF THE PREFERRED EMBODIMENTS

Referring now in detail to the single figure of the drawing, there is seen a containment 1 of a nuclear power station that is not represented in greater detail. The containment 1 has a central electrode 2 for igniting hydrogen contained in a hydrogen/air mixture. The central electrode 2 is connected to a high-voltage source 4. The high-voltage source 4 is constructed as a high-frequency high-voltage source for generating a high voltage of more than a disruptive discharge voltage of air with a frequency of more than 1 kHz. The disruptive discharge voltage of air is determined from the frequency-dependent disruptive field strength of air and the dimensions of the containment 1.

A number of internal parts 6 are disposed inside the containment 1. In this case, the internal parts 6 include a reactor core and further operating and maintenance devices.

In the event of an accident situation, be it ever so improbable, hydrogen gas can be released inside the containment 1. This released hydrogen is ignited in order to prevent the formation of an explosive gas mixture. The central electrode 2 which is connected to the high-voltage source 4 is activated for this purpose. For this purpose, the high-voltage source 4 generates a high voltage of more than the disruptive discharge voltage of air, referring to the internal dimensions of the containment, 1. This high voltage causes discharges of the central electrode 2 in the form of lightning flashes 8. In this configuration, each internal part 6, or also another structural part such as, for example, the wall of the containment 1, can function as a counter-electrode. Due to the chaotic nature, that is to say the statistical occurrence, of the lightning flashes 8, after even a short time the entire volume inside the containment 1 is penetrated by the lightning flashes 8. The released hydrogen is thereby ignited in the entire volume inside the containment 1, thus reliably preventing a critical limiting value for the hydrogen concentration in the entire volume inside the containment 1 from being exceeded.

In order to generate a preferred direction of the lightning flashes 8, a number of counter-electrodes 10 are disposed in a subregion or subspace inside the containment 1, in which it is necessary to expect the release of hydrogen gas with a relatively high probability. This subregion that is detected as a possible hydrogen source is thus penetrated by lightning flashes 8 particularly frequently, with the result that the hydrogen released there is ignited in a particularly reliable manner.

I claim:

1. A containment of a nuclear power station, comprising:
    a device for igniting hydrogen contained in a hydrogen/air mixture, said device including a central electrode for lightning flash generation and a high-voltage source connected to said central electrode for generating a high voltage greater than a disruptive discharge voltage of air.

2. The containment according to claim 1, wherein said high-voltage source generates a high voltage with a frequency of more than 1 kHz.

3. The containment according to claim 1, including a number of counter-electrodes disposed in an interior of the containment for conducting lightning flashes.

* * * * *